United States Patent [19]

Aihara et al.

[11] Patent Number: 5,826,314
[45] Date of Patent: Oct. 27, 1998

[54] DEVICE FOR TRANSVERSELY STRETCHING WEB

[75] Inventors: Kintaro Aihara, Chiba; Kazuhiko Kurihara, Itabashi-ku; Hiroshi Yazawa, Kunitachi, all of Japan

[73] Assignees: Nippon Petrochemicals Company, Limited; Polymer Processing Research Inst., Ltd., both of Tokyo, Japan

[21] Appl. No.: 894,726

[22] PCT Filed: Dec. 28, 1995

[86] PCT No.: PCT/JP95/02772

§ 371 Date: Dec. 3, 1997

§ 102(e) Date: Dec. 3, 1997

[87] PCT Pub. No.: WO97/24216

PCT Pub. Date: Jul. 10, 1997

[30] Foreign Application Priority Data

Jul. 1, 1994 [JP] Japan ................................. 6-150884

[51] Int. Cl.$^6$ ................................................. D06C 3/06
[52] U.S. Cl. ................................................. 26/88; 26/90
[58] Field of Search ........................... 26/88, 89, 90, 26/97, 93, 96, 71, 72; 264/288.4, 291

[56] References Cited

U.S. PATENT DOCUMENTS

| 1,238,742 | 9/1917 | Butler | 26/90 |
| 2,988,772 | 6/1961 | Horn | 26/88 |
| 3,509,607 | 5/1970 | Fleissner | 26/97 |
| 3,807,004 | 4/1974 | Anderson | 26/59 |
| 3,833,973 | 9/1974 | Schwarz | 26/90 |
| 4,331,624 | 5/1982 | Yazawa et al. | 26/90 |
| 4,349,500 | 9/1982 | Yazawa et al. | 26/88 |
| 5,043,036 | 8/1991 | Swenson | 26/97 |

FOREIGN PATENT DOCUMENTS

| 2245306 | 3/1974 | Germany | 26/88 |
| 57-16320 | 1/1982 | Japan . | |
| 63-15727 | 1/1988 | Japan . | |

Primary Examiner—Amy B. Vamatta
Attorney, Agent, or Firm—Burns, Doane, Swecker & Mathis, L.L.P.

[57] ABSTRACT

A device for transversely stretching a web includes a pair of pulleys arranged in the substantially same plane and rotating in the opposite directions to each other and a pair of belts running around the pulleys, respectively. The web is widthwise stretched, by gripping opposite side edges thereof by the pulleys and the belts and conveying the web in a divergent manner. At least one pair of pressing rolls are provided at an inclination relative to the belts for pressing the opposite side edges of the web onto the belts prior to being gripped between the pulleys and the belts. According to this structure, a device for transversely stretching a web is realized which is capable of effectively preventing the web from being dropped from the grip.

5 Claims, 8 Drawing Sheets

DEVICE FOR TRANSVERSELY STRETCHING WEB

TECHNICAL FIELD

The present invention relates to a device for transversely (in the widthwise direction) stretching a stretchable web such as a film, a fibrous material or a net-like material.

BACKGROUND ART

The most popular device for transversely stretching the above described kind of web is a tenter. However, a tenter is large in size to require a wide space for the installation thereof and is generally expensive. Accordingly, there is proposed a device for transversely stretching a web which is small in size and simple in structure, wherein a pair of pulleys and a pair of belts are combined.

FIG. 7 illustrates a device for transversely stretching a flat web, which is disclosed in Japanese Examined Patent Publication No. 57-30368. In this device, a pair of pulleys 2, 2' having the same shape and same size are held in a cantilever manner on the same side in symmetry with each other relative to a center line 1, and driven for rotation at the same speed in the opposite directions in the same vertical plane, as shown by arrows. A pair of belts 3, 3' are arranged to circulate, starting from generally vertical and parallel path portions closer to the center line 1, through semi-circular portions guided by the lower halves or less of circumferences of the pulleys 2, 2' to the starting points via guide pulleys 5, 6 and 5', 6', respectively.

Releasing points of the belts 3, 3' from the circumference of the pulleys 2, 2' are determined by positions of the guide pulleys 5, 5' relative to axes of the pulleys 2, 2', and the tensions of the belts 3, 3' are adjusted by displacing the guide pulleys 6, 6' upward or downward. The lower semi-circular portions of the pulleys 2, 2' are immersed into a hot bath 9.

A web 10 to be stretched is fed along the belts 3, 3' running generally vertically downward, so that a center line of the web coincides with the center line 1 between the belts 3, 3', and on the side of the pulleys 2, 2' opposite to the cantilever shafts of the pulleys 2, 2'. Selvages of the web 10 are bent by selvage guides 11 and the bent portions are gripped between the belts 3, 3' and the pulleys 2, 2'. The selvages are pressed onto the circumference of the pulleys 2, 2' by the tension of the belts 3, 3' without slip, and the web is introduced into the hot bath 9 along divergent arcuate tracks as the pulleys 2, 2' rotate, so that a portion of the web 10 between the selvages is transversely stretched until the belts 3, 3' are released from the pulleys 2, 2'.

In the above mentioned prior art web stretching device, it is difficult to securely grip the selvages of the web. Although the selvage guide 11 is used for bending and guiding the selvages, either one of the selvages often drops off from the pulley in practice because of the heterogeneity of the web to be stretched, a slight difference or fluctuation in the gripping position or a slight difference in the pressure between both the assemblies of pulley and belt as well as the meandering movement inherent to web transportation. Thus, a stable operation of the device is difficult to achieve.

To solve the above drawback, as shown in FIG. 8, a device disclosed in Japanese Unexamined Utility Model Publication (Kokai) No. 57-16320 is provided with selvage pressing rolls 17, 17' for pressing the selvages of the web 10 onto the belts 3, 3' prior to the introduction of the web 10 to the pulleys 2, 2'. The grip reliability is somewhat improved, since the pressing rolls 17, 17' press the web 10 onto the belts 3, 3' without inclination, but the grip instability is not fundamentally solved. Also, according to this method, a wide salvage is necessary to obtain a large gripping force, with the result that the salvages which are not stretched increase to a great extent, and yield of the material and production cost are deteriorated.

SUMMARY OF THE INVENTION

An object of the present invention is to solve the above described problems of the prior art and to provide a device for transversely stretching a web by which effectively prevents the web from dropping from the grip.

According to the present invention, a device is provided for transversely stretching a web, comprising a pair of pulleys arranged in the same plane and rotating in opposite directions to each other and a pair of belts running around the pulleys, respectively, wherein the web is widthwise stretched by being gripped on opposite side edges thereof by the pulleys and the belts and conveying the web in a divergent manner, characterized in that at least one pair of pressing rolls are provided at an inclination relative to the belts for pressing the opposite side edges of the web onto the belts prior to being gripped between the pulleys and the belts.

In this construction, the side edges of the web are pulled obliquely outward prior to be gripped by the pulleys and the belts so that the movement of the web is controlled so that the side edges are not dropped until the web is assuredly gripped by the pulley and the belts. Also, the pressing force per unit area increases by pressing the side edges of the web to the corner of the belt, whereby the width of the side edges can be reduced and the side edges are further prevented from dropping from the grip. In this regard, the pressing forces of both the pressing rolls are always equal to each other.

The pressing rolls are preferably inclined to draw the side edges of the web into a grip between the pulleys and the belts or to press the side edges of the web onto the corner of the belt. More preferably, the pressing rolls are inclined for both the above purposes.

Also, there are holding means arranged for independently movably supporting the pair of pressing rolls in the widthwise direction of the web, and pressure applying means arranged for pressing the pair of pressing rolls onto the corresponding belts with an identical pressure.

Further, the pair of belts are arranged to form divergent tracks in the web running direction when the web is introduced to the pulleys.

BRIEF DESCRIPTION OF THE DRAWINGS

The present invention will be described in more detail with reference to the preferred embodiments illustrated in the attached drawings, in which.

BEST MODES FOR CARRYING OUT THE INVENTION

Figure 1:
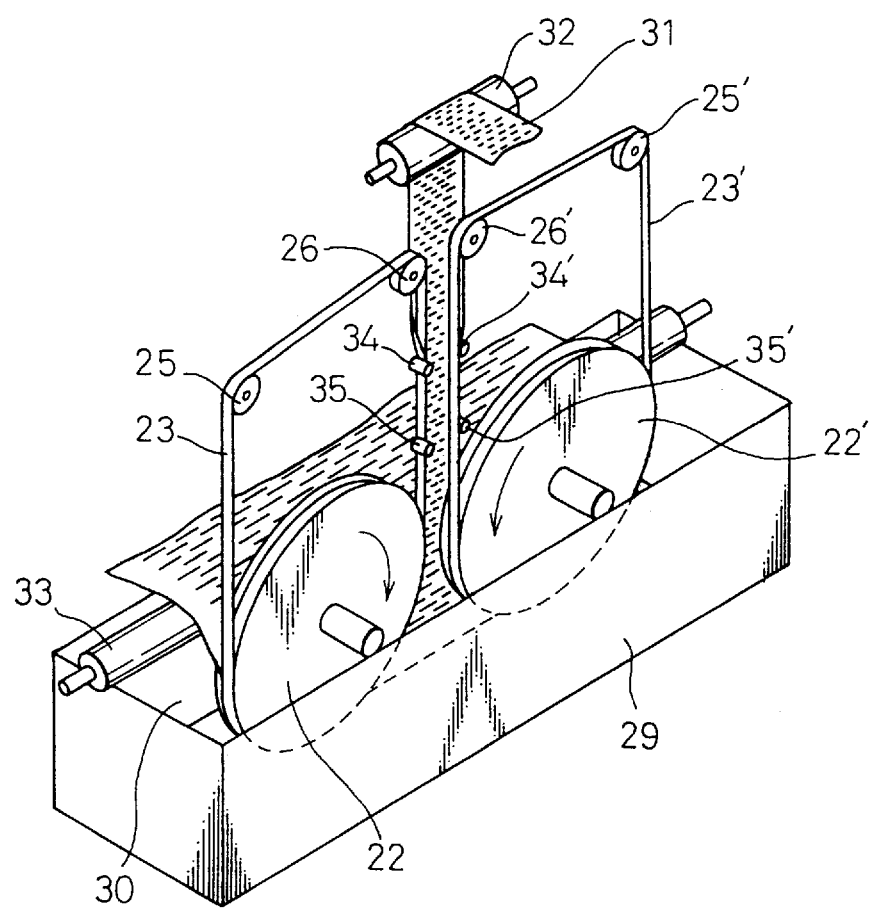
FIG. 1 is a perspective view illustrating the first embodiment of the present invention.

In FIG. 1, the numerals 22, 22' indicate a pair of stretching pulleys arranged in the substantially same plane and driven for rotation in the opposite directions, as shown by the arrows. A pair of endless belts 23, 23' run around the lower halves of the pulleys 22, 22', respectively, and further around guide pulleys 25, 26 and 25', 26', respectively, so as to circulate in an endless manner. The lower halves of the pulleys 22, 22' are immersed in a hot bath 30 in a hot vessel 29.

The guide pulleys 26, 26' are located above the belt winding-start points of the stretching rolls 22, 22'. The distance between portions of the belts 23, 23' running from the guide pulleys 26, 26' to the stretching pulleys 22, 22' is smaller than the width of a slit film (web) 31, having transverse slits, to be stretched.

A turn roll 32 is provided above the guide pulleys 26, 26', for changing the conveying direction of the unstretched slit film 31 to the guide pulleys 26, 26', and turn roll 33 is provided on one side of the stretching pulleys 22, 22', for taking up the slit film.

Two pairs of pressing rolls 34, 34' and 35, 35' are provided between the guide pulleys 26, 26' and the belt winding-start points of the stretching rolls 22, 22', for pressing side edges of selvage portions, of the slit film 31, having no slits onto the belts 23, 23'.

Figure 2:
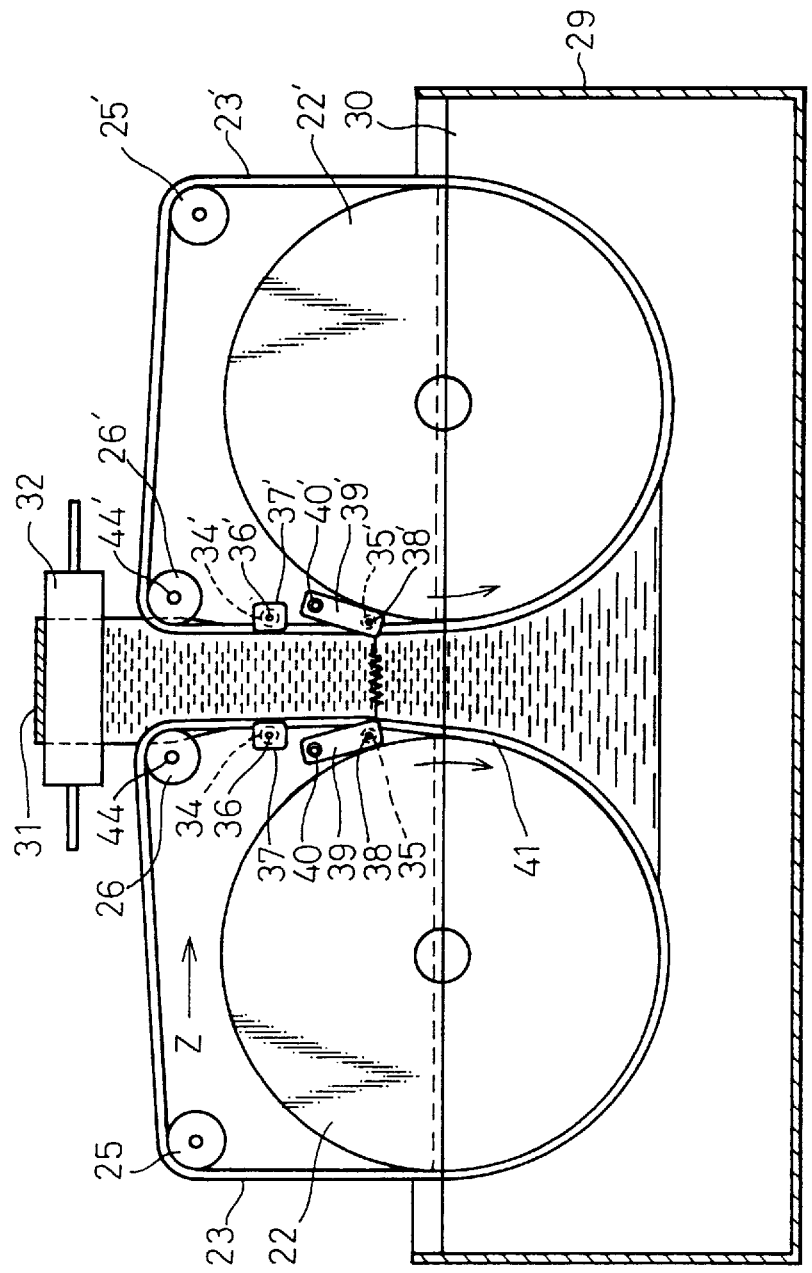
FIG. 2 is a front view illustrating the first embodiment of the present invention.

As shown in FIG. 2, the first pair of pressing rolls 34, 34' are supported by first holders 37, 37' via first rotary shafts 36, 36', respectively. The second pressing rolls 35, 35' are supported by second holders 39, 39' via second rotary shafts 38, 38', the second holders 39, 39' being rotatably supported by rotary shafts 40, 40'. A pulling spring (pressing force applying means) 41 is secured at opposite ends thereof to the respective movable one ends of the second holders 39, 39', so that the pressing forces of the second pressing rolls 35, 35' are identical. In this regard, the adjustment of the pressing force can be carried out by replacing the spring to one having a different spring force, or by changing the strength of the spring by a bolt-nut mechanism.

In addition, the belts 23, 23' are disposed to form divergent tracks in the running direction thereof when the belts 23, 23' are introduced to the stretching pulleys 22, 22', due to the arrangement of the guide pulleys 26, 26', the first pressing rolls 34, 34' and the second pressing rolls 35, 35'.

Figure 3:
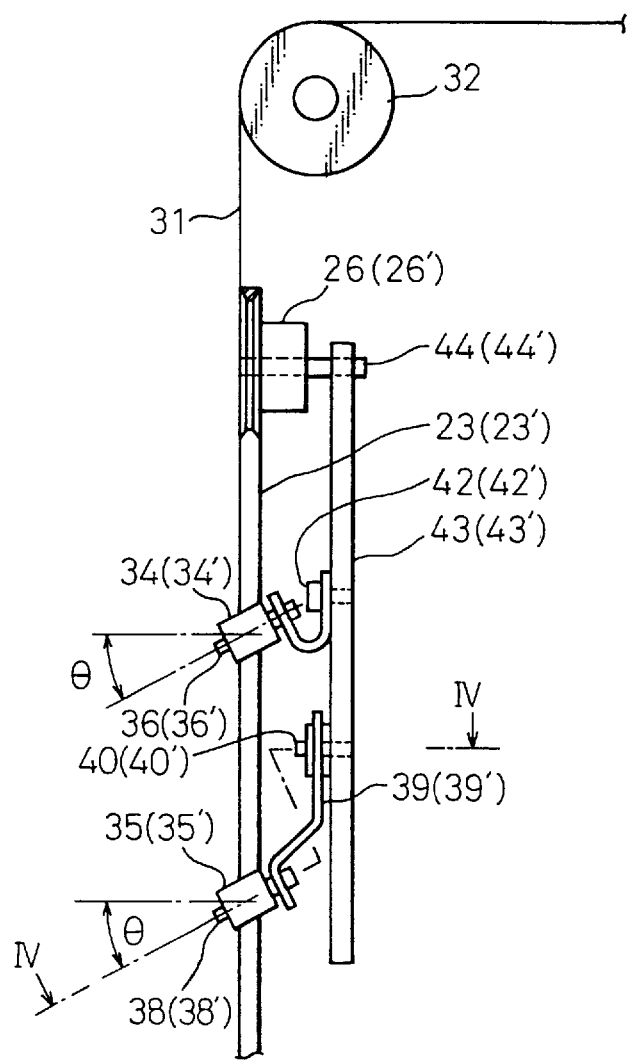
FIG. 3 is a view as seen in the direction of arrow Z in FIG. 2.

As shown in FIG. 3, the first holder 37 (37') is supported by a support plate 43 (43') at the vertically, substantially central point thereof via a fastener 42 (42'), the rotary shaft 40 (40') being mounted to the lower point of the support plate 43 (43'). The top of the holding plate 43, (43') is rotatably supported by shaft 44 (44') of the guide pulley 26 (26').

Figure 4:
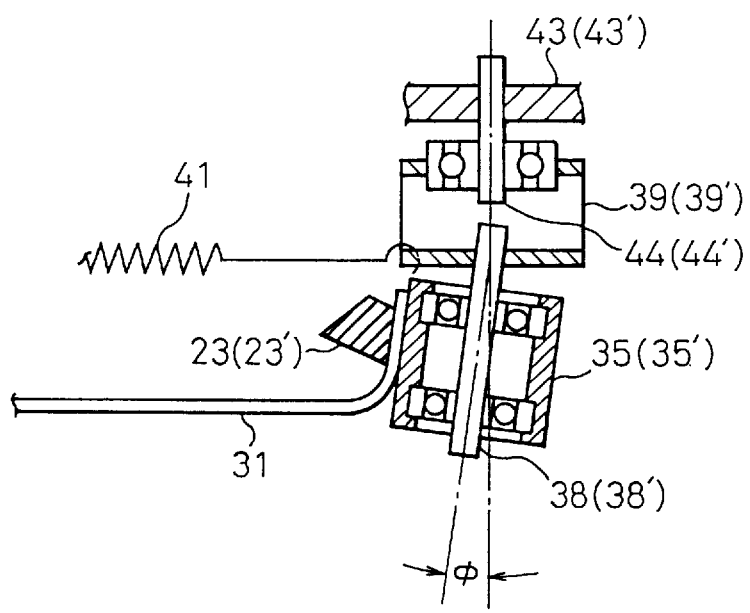
FIG. 4 is a cross-sectional view taken along the line IV—IV in FIG. 3.

The rotary shafts 36 (36') and 38 (38') of the first and second pressing rolls 34 (35') and 35 (35') are inclined at θ° relative to the horizontal plane so that the selvage of the slit film 31 is drawn to be forcibly gripped between the inner surface of the belt 23 (23') and the pulley 22 (22'). Further, as shown in FIG. 4, the shaft 38 (38') of the pressing roll 35 (35') is inclined inward at φ° so that the pressing roll 35 (35') presses the selvage of the web 31 onto the corner of the belt 23 (23'). In this regard, the pressing roll 34 (34') not shown is also inclined in a similar manner.

While two pairs of pressing rolls are provided in this embodiment, it is possible to arrange the lower pair only. Also, a surface of the pressing roll may be knurled for the purpose of slip resistance.

The operation of the embodiment thus structured will be described as follows.

In FIGS. 1 and 2, the slit film 31 is introduced into the device in the horizontal direction and deflected downward at 90° by the turn roll 32. Then, the selvages thereof are bent by the first and second pressing rolls 34, 34' and 35, 35' and simultaneously therewith, as shown in FIG. 4, pressed onto the belts 23, 23' so that the selvages are gripped between the stretching pulleys 22, 22' and the belts 23, 23'. The slit film 31 with the selvages gripped is divergently stretched in the transverse direction as the pulleys 22, 22' rotate. The course of the slit film 31 is reversed at the lower end of the pulleys while being further stretched, and released from the pulley 22, 22' at a point at which the belts 23, 23' are departed from the pulleys 22, 22'.

In this case, since the pressing rolls 34, 34' and 35, 35' are mounted so that the shafts 36, 36' and 38, 38' are inclined at angles φ and θ, respectively, the pressing rolls 34, 34' and 35, 35' are not meshed with the belts 23, 23', but the pressing rolls 34, 34' and 35, 35' are brought into point or line contact with the belts 23, 23' the pressing force is relatively great and there is an action to draw the selvage to forcibly grip the latter. Thus, it is possible to decrease a width of the selvage. In this regard, the inclination φ mainly serves for increasing the pressing force and the inclination θ mainly serves for drawing the selvage into a grip.

That is, since the pressing rolls 34, 34' and 35, 35' are inclined at the angle θ, the selvages of the slit film 31 are pulled by the pressing rolls 34, 34' and 35, 35' to the opposite side of the belts 23, 23', whereby the selvages are not dropped off from the belts 23, 23' but are assuredly gripped between the stretching pulleys 22, 22' and the belts 23, 23'. Also, since the pressing rolls 34, 34' and 35, 35' are inclined at the angle θ, the slit film 31 is pressed to the corners of the belts 23, 23' by the pressing rolls 34, 34' and 35, 35'. In this case, as shown in FIG. 4, while it may seem that the belts 23, 23' are twisted and the slit film 31 is pressed onto the side surface of the belts 23, 23' by the pressing rolls 34, 34' and 35, 35' the pressing force at the corner of the belts 23, 23' becomes larger, due to the recovery force of the belts 23, 23', whereby the pressing force per unit area becomes larger and the selvages are assuredly gripped. Accordingly, it is possible to reduce a width of the selvages which are not stretched and thus to improve the yield of production. In this regard, it is enough to provide either one of the inclinations φ and θ to stop the selvage of the slit film 31 being dropped by the belts 23, 23'.

Since the pressing forces of the presser rolls 35, 35' are equalized by the tension spring 41, the selvages are seldom dropped from the belts 23, 23'.

The inclination angles θ and φ of the shafts 36, 36' of the pressing rolls 34, 34' and 35, 35' are suitably selected in view of the characteristic of the slit film 31 to be stretched, the frictional coefficient between the slit film 31 and the pressing rolls 34, 34' and 35, 35', the pressing force of the pressing rolls 34, 34' and 35, 35', tension of the belts 23, 23', the line speed or others, so that the most stable operation is obtained. For example, when a net-like slit film 31 of high density polyethylene having a thickness of 140 μm is processed at a line speed of 40 m/min, with stainless steel pressing rolls 34, 34' and 35, 35' having a knurled surface, it is recommended that θ is 20° and φ is 5°.

Figure 5:
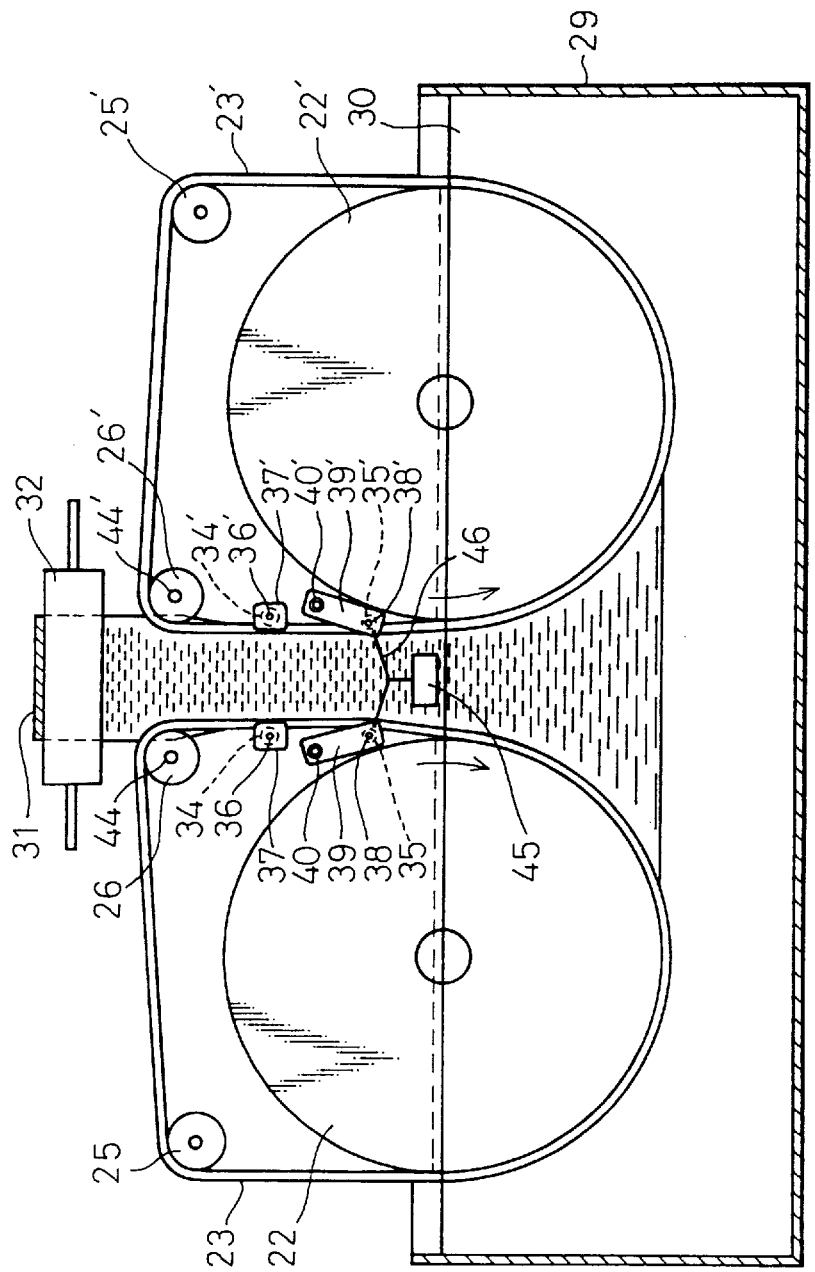
FIG. 5 is a front view illustrating the second embodiment of the present invention.

FIG. 5 illustrates the second embodiment of the present invention, wherein a weight (pressing force applying means) 45 is provided instead of the tension spring in the preceding embodiment. That is, a wire 46 is fixed at opposite ends thereof to movable ends of second holders 39, 39', and the weight 45 is suspended from the center of the wire 46. Thereby the pressing forces of the second presser rolls 35, 35' are equalized.

Figure 6:
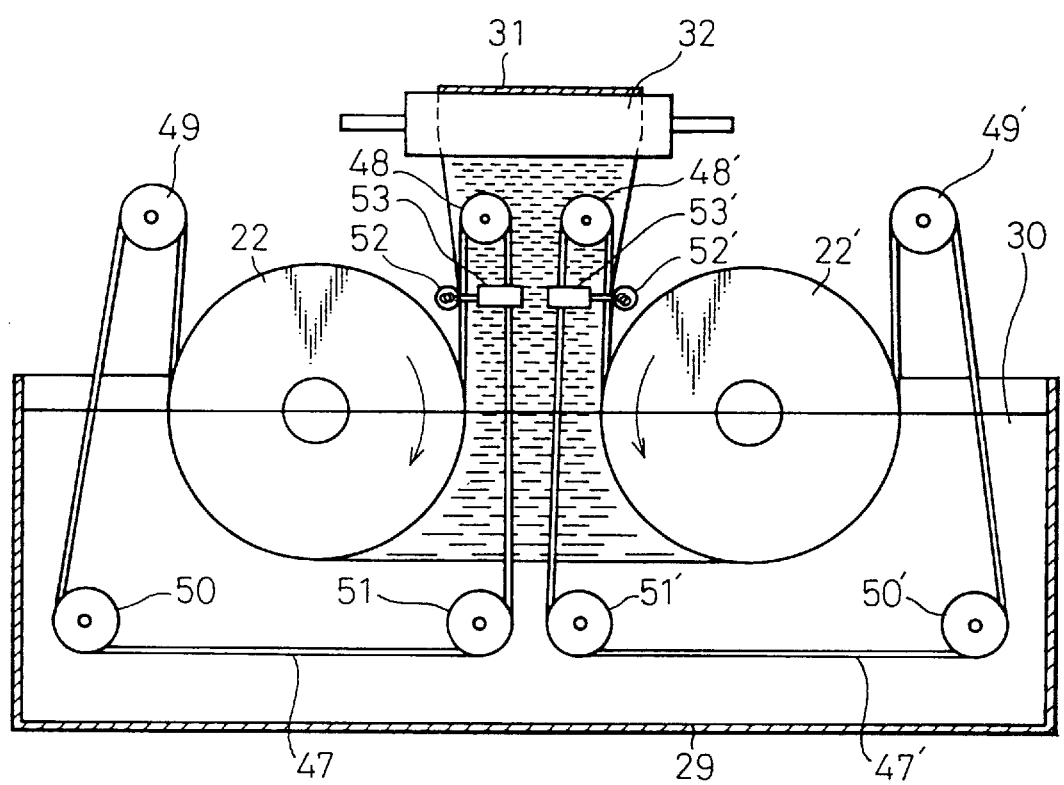
FIG. 6 is a front view illustrating the third embodiment of the present invention.
Figure 7:
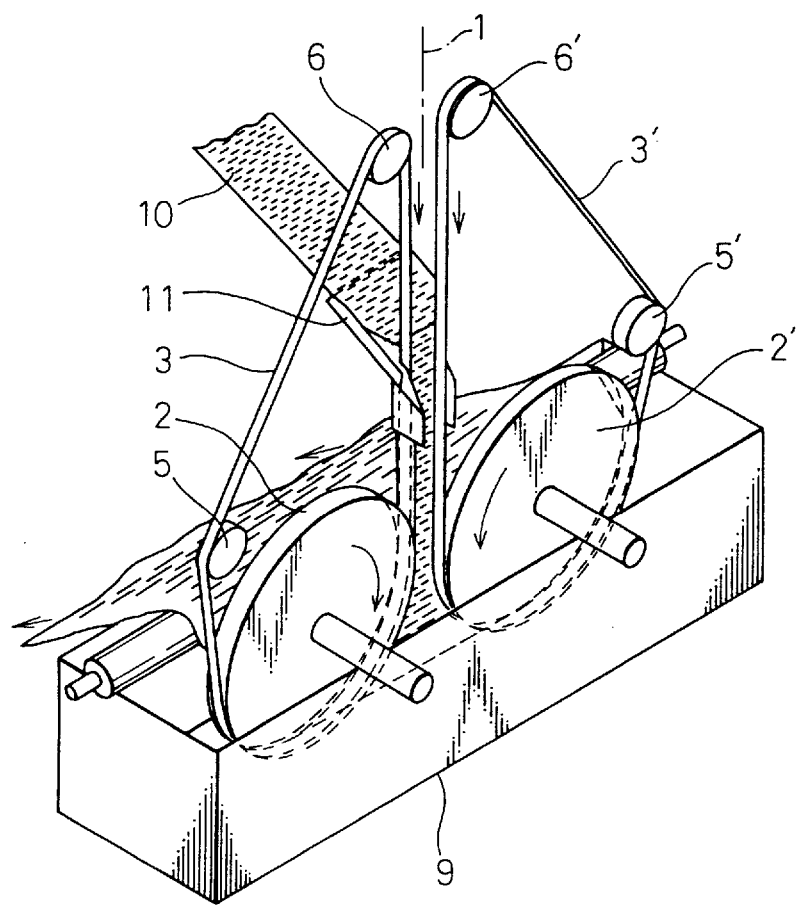
FIG. 7 is a perspective view a device for transversely stretching a web of a prior art.
Figure 8:
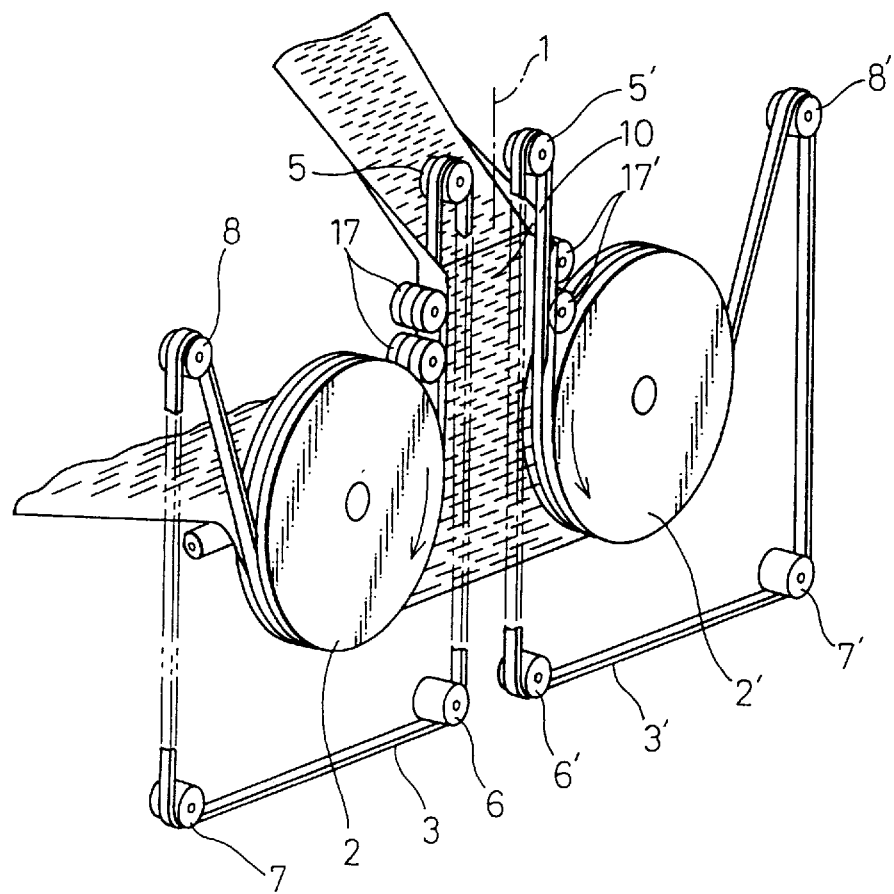
FIG. 8 is a perspective view a device for transversely stretching a web of another prior art.

FIG. 6 illustrates the third embodiment of the present invention wherein the same reference numerals are used for denoting the same parts as in the first embodiment and an explanation thereof is not given.

In this embodiment, a pair of belts 47, 47' are arranged to circulate around the lower periphery of a pair of pulleys 47, 47' via guide pulleys 48, 49, 50, 51 and 48', 49', 50', 51', respectively, and a pair of pressing rolls 52, 52' are transversely slidably supported by holders (not shown) and biased toward the belts 47, 47' by pneumatic cylinders 53, 53'.

In this regard, the pneumatic cylinders 53, 53' are supplied with air from a common compressed air source so that the pressing forces of the pressing rolls 52, 52' are equalized.

The second and third embodiments thus constructed are identical to the first embodiment in principle, and operation and the effect are similar to those of the first embodiment.

The stretching pulleys 22, 22' are arranged in the same plane in the first to third embodiments, but it is possible to arrange the stretching pulleys at an angle between them in a truncated inverted-V shape.

As stated above, according to the present invention, it is possible to provide a device for transversely stretching a web while effectively preventing the web from being dropped from the grip.

We claim:

1. A device for transversely stretching a web, said device comprising a pair of pulleys arranged in the substantially same plane and rotating in the opposite directions to each other, and a pair of belts running around the pulleys, respectively, wherein the web is widthwise stretched, by gripping opposite side edges thereof by said pulleys and said belts and conveying the web in a divergent manner characterized in that at least one pair of pressing rolls are provided at an inclination relative to the belts for pressing the side edges of the web onto the belts prior to being gripped between the pulleys and the belts.

2. A device for transversely extending a web as defined by claim 1, characterized in that the pressing rolls are inclined to draw the side edges of the web into a grip between the pulley and the belt.

3. A device for transversely extending a web as defined by claim 1, characterized in that the pressing rolls are inclined so as to press the side edges of the web onto the corners of the belts.

4. A device for transversely extending a web as defined by claim 1, characterized in that holding means are arranged for independently movably supporting the pair of presser rolls in the widthwise direction of the web, and pressure applying means is arranged for pressing the pair of presser rolls onto the corresponding belts with an identical pressure.

5. A device for transversely extending a web as defined by claim 1, characterized in that the pair of belts are arranged to form divergent tracks in the web running direction when the web is introduced to the pulleys.

* * * * *